(12) United States Patent
Atmur et al.

(10) Patent No.: US 10,215,244 B2
(45) Date of Patent: Feb. 26, 2019

(54) ELLIPTICALLY INTERFACING GEAR ASSISTED BRAKING SYSTEM

(71) Applicant: The Boeing Company, Chicago, IL (US)

(72) Inventors: Robert J. Atmur, Whittier, CA (US); William Patrick Sargent, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 121 days.

(21) Appl. No.: 15/448,490

(22) Filed: Mar. 2, 2017

(65) Prior Publication Data

US 2018/0252279 A1    Sep. 6, 2018

(51) Int. Cl.
*F16D 63/00*     (2006.01)
*F16D 55/22*     (2006.01)
(Continued)

(52) U.S. Cl.
CPC .............. *F16D 63/004* (2013.01); *B60T 1/12* (2013.01); *B64C 25/44* (2013.01); *F16D 55/025* (2013.01);
(Continued)

(58) Field of Classification Search
CPC ........ F16D 55/025; F16D 55/22; F16D 63/00; F16D 63/004; F16D 65/12;
(Continued)

(56) References Cited

U.S. PATENT DOCUMENTS

| 37,165 A | 12/1862 | Gary |
|---|---|---|
| 1,611,981 A | 12/1926 | Amberg |

(Continued)

FOREIGN PATENT DOCUMENTS

| CH | 233459 A | 7/1944 |
|---|---|---|
| CN | 2276093 Y | 3/1998 |

(Continued)

OTHER PUBLICATIONS

Antonio S de Castro; Exploring a rehnomic system; Dec. 23, 1999, retrieved from the internet at https://arxiv.org/pdf/physics/9912049.pdf, 6 pages.

(Continued)

*Primary Examiner* — Thomas W Irvin
(74) *Attorney, Agent, or Firm* — Kolisch Hartwell, P.C.

(57) ABSTRACT

An elliptically interfacing gear assisted braking system may include an input shaft with a coupled input gear, a wobble plate, a rotor with a reaction gear, and an actuated brake mechanism, or brake. The input shaft may define an axis of rotation and the wobble plate may have a wobble axis disposed at a non-zero angle relative to the rotation axis. A set of face teeth disposed on one surface of the wobble plate may partially mesh with the input gear, and a set of wobble teeth on an opposite surface of the wobble plate may partially mesh with the reaction gear. Rotation of the input shaft may thereby cause rotation of the wobble plate and rotor. The brake may mate with the rotor and when actuated, slow the rotor with respect to the input shaft. Rolling contact forces between the surfaces of the wobble teeth and reaction teeth may then induce nutation in the wobble plate, thereby dissipating rotational energy.

20 Claims, 9 Drawing Sheets

(51) Int. Cl.
  *F16D 55/02* (2006.01)
  *F16D 65/12* (2006.01)
  *B64C 25/44* (2006.01)
  *B60T 1/12* (2006.01)
  *F16H 1/32* (2006.01)
  *F16D 65/02* (2006.01)
  *F16D 127/12* (2012.01)

(52) U.S. Cl.
  CPC ............ *F16D 55/22* (2013.01); *F16D 63/00* (2013.01); *F16D 65/12* (2013.01); *F16H 1/321* (2013.01); *F16D 2065/1304* (2013.01); *F16D 2065/136* (2013.01); *F16D 2065/1348* (2013.01); *F16D 2065/1376* (2013.01); *F16D 2065/1388* (2013.01); *F16D 2065/1392* (2013.01); *F16D 2127/12* (2013.01)

(58) Field of Classification Search
  CPC ..... F16D 2065/1304; F16D 2065/1348; F16D 2065/136; F16D 2065/1376; F16D 2065/1388; F16D 2065/1392; F16D 2065/12; F16H 1/321; H02K 41/06; H02K 41/065
  See application file for complete search history.

(56) References Cited

U.S. PATENT DOCUMENTS

| | | | |
|---|---|---|---|
| 2,275,827 A | 3/1942 | Plensler | |
| 2,458,983 A | 1/1949 | Dunn | |
| 2,509,391 A | 5/1950 | Hansen et al. | |
| 2,699,690 A | 1/1955 | Kobler | |
| 2,703,370 A | 3/1955 | Steensen | |
| 2,857,536 A | 10/1958 | Light | |
| 2,866,110 A | 12/1958 | Schön | |
| 2,871,382 A | 1/1959 | Bouvier | |
| 2,908,191 A | 10/1959 | Sundt | |
| 3,117,244 A | 1/1964 | Rosain et al. | |
| 3,234,393 A | 2/1966 | Ruschmann | |
| 3,249,776 A | 5/1966 | Anderson et al. | |
| 3,322,984 A | 5/1967 | Anderson | |
| 3,341,726 A | 9/1967 | Brinster et al. | |
| 3,428,839 A | 2/1969 | Singleton et al. | |
| 3,463,953 A | 8/1969 | Maxwell | |
| 3,474,272 A | 10/1969 | Newell | |
| 3,525,890 A | 8/1970 | Buchanan, Jr. | |
| 3,539,847 A | 11/1970 | Gifford | |
| 3,579,276 A | 5/1971 | Newell | |
| 3,640,154 A | 2/1972 | Massie | |
| 3,918,315 A | 11/1975 | Rouverol | |
| 3,935,750 A | 2/1976 | Maroth | |
| 4,041,808 A | 8/1977 | Fickelscher | |
| RE29,411 E | 9/1977 | Newell | |
| 4,081,702 A | 3/1978 | Neumann | |
| 4,108,017 A | 8/1978 | Rouverol | |
| 4,330,725 A | 5/1982 | Hintz | |
| 4,495,432 A | 1/1985 | Katsuma et al. | |
| 4,906,881 A | 3/1990 | Knight | |
| 5,111,102 A | 5/1992 | Meeks | |
| 5,747,915 A | 5/1998 | Benavides | |
| 5,804,898 A | 9/1998 | Kawai | |
| 5,820,504 A | 10/1998 | Geralde | |
| 5,906,142 A | 5/1999 | Shirasawa | |
| 5,954,610 A | 9/1999 | Kamimura | |
| 6,431,330 B1 * | 8/2002 | Poertzgen ............ B60T 13/741 188/156 |
| 6,568,929 B2 | 5/2003 | Takagi | |
| 6,664,711 B2 | 12/2003 | Baudendistel | |
| 7,165,473 B2 | 1/2007 | Kobayashi et al. | |
| 7,540,865 B2 | 6/2009 | Griffin et al. | |
| 7,824,345 B2 | 11/2010 | Euteneuer et al. | |
| 7,841,994 B2 | 11/2010 | Skujins et al. | |
| 7,850,623 B2 | 12/2010 | Griffin et al. | |
| 7,878,984 B2 | 2/2011 | Jacobsen et al. | |
| 7,914,466 B2 | 3/2011 | Davis et al. | |
| 7,914,467 B2 | 3/2011 | Layman et al. | |
| 7,969,055 B2 | 6/2011 | Titus | |
| 8,022,331 B2 | 9/2011 | Reynolds et al. | |
| 8,048,004 B2 | 11/2011 | Davis et al. | |
| 8,048,060 B2 | 11/2011 | Griffin et al. | |
| 8,105,246 B2 | 1/2012 | Voeller et al. | |
| 8,137,293 B2 | 3/2012 | Zhou et al. | |
| 8,169,118 B2 | 5/2012 | Filatov | |
| 8,182,465 B2 | 5/2012 | Griffin et al. | |
| 8,210,070 B2 | 7/2012 | Takahashi et al. | |
| 8,231,551 B2 | 7/2012 | Griffin et al. | |
| 8,257,279 B2 | 9/2012 | Davis et al. | |
| 8,368,269 B2 | 2/2013 | Titus | |
| 8,376,961 B2 | 2/2013 | Layman et al. | |
| 8,377,035 B2 | 2/2013 | Zhou et al. | |
| 8,409,114 B2 | 4/2013 | Parins | |
| 8,449,526 B2 | 5/2013 | Snyder et al. | |
| 8,535,243 B2 | 9/2013 | Shireman | |
| 8,551,020 B2 | 10/2013 | Chen et al. | |
| 8,551,021 B2 | 10/2013 | Voeller et al. | |
| 8,556,914 B2 | 10/2013 | Vrba | |
| 8,636,716 B2 | 1/2014 | Griffin et al. | |
| 8,646,360 B2 | 2/2014 | Kanai | |
| 8,936,525 B2 * | 1/2015 | Shimada ............... B60K 7/0007 475/149 |
| 9,124,150 B2 * | 9/2015 | Atmur ...................... G05D 3/12 |
| 9,164,497 B2 * | 10/2015 | Cameron ............. G05B 11/011 |
| 9,281,736 B2 | 3/2016 | Atmur et al. | |
| 9,404,489 B1 | 8/2016 | Atmur et al. | |
| 9,427,866 B2 | 8/2016 | Hasegawa | |
| 9,768,664 B2 | 9/2017 | Atmur et al. | |
| 10,024,391 B2 * | 7/2018 | Atmur ..................... F16H 1/321 |
| 2009/0064812 A1 | 3/2009 | Gutmann et al. | |
| 2010/0224435 A1 | 9/2010 | Yamamori | |
| 2014/0285072 A1 | 9/2014 | Atmur et al. | |
| 2015/0015174 A1 | 1/2015 | Atmur | |
| 2015/0024896 A1 | 1/2015 | Takahashi et al. | |
| 2016/0172928 A1 | 6/2016 | Atmur | |
| 2016/0172929 A1 | 6/2016 | Atmur et al. | |
| 2016/0327015 A1 | 11/2016 | Iida et al. | |
| 2016/0344255 A1 | 11/2016 | Atmur et al. | |
| 2017/0122409 A1 | 5/2017 | Atmur et al. | |
| 2017/0191549 A1 | 7/2017 | Atmur et al. | |
| 2018/0034355 A1 * | 2/2018 | Peck, Jr. .................. H02K 1/14 |

FOREIGN PATENT DOCUMENTS

| | | |
|---|---|---|
| CN | 203098755 U | 7/2013 |
| CN | 104065202 A | 9/2014 |
| DE | 10028964 A1 | 1/2002 |
| DE | 10237686 A1 | 2/2004 |
| DE | 102009002587 A1 | 10/2010 |
| DE | 10237686 B4 | 4/2013 |
| EP | 0565746 A1 | 10/1993 |
| EP | 2169263 A1 | 3/2010 |
| EP | 2169263 B1 | 10/2011 |
| EP | 2535136 A1 | 12/2012 |
| EP | 2782230 A2 | 9/2014 |
| EP | 2838186 A2 | 2/2015 |
| EP | 2933531 A1 | 10/2015 |
| EP | 3096444 A1 | 11/2016 |
| GB | 2211900 A | 7/1989 |
| GB | 2327998 A | 2/1999 |
| JP | S59113345 A | 6/1984 |
| JP | 60017749 A | 1/1985 |
| JP | 2014187867 A | 10/2014 |
| JP | 2015039286 A | 2/2015 |
| WO | 2008149696 A1 | 12/2008 |
| WO | 2011154981 A1 | 12/2011 |
| WO | 2014051131 A1 | 4/2014 |
| WO | 2014118284 A2 | 8/2014 |

OTHER PUBLICATIONS

Machine Design, Sometimes it Pays to be Eccentric, May 18, 2000, retrieved from the Internet on Feb. 18, 2015 from http://machinedesign.com/archive/sometimes-it-pays-be-eccentric, 7 pages.

(56) References Cited

OTHER PUBLICATIONS

Machine Design, Flexible gears minimize gearhead backlash for life, Jun. 7, 2001, retrieved from the internet on Feb. 18, 2015 from http://machinedesign.com/archive/flexible-gears-minimize-gearhead-backlash-life, 4 pages.

Machine Design, Flatter reducer makes waves, Jan. 24, 2002, retrieved from the internet on Feb. 18, 2015 from http://machinedesign.com/archive/flatter-reducer-makes-waves, 4 pages.

Carl A. Nelson et al., Similarity and Equivalence of Nutating Mechanisms to Bevel Epicyclic Gear Trains for Modeling and Analysis, Journal of Mechanical Design, Mar. 2005, vol. 127, 9 pages.

M. Elmoznino et al., An electro-mechanical Pericyclic CVT (P-CVT), 12th IFToMM World Congress, Besancon, France, Jun. 18-21, 2007, 6 pages.

Francesco Fasso et al., An elemental overview of the nonholonomic Noether theorem, Oct. 18, 2009, 11 pages.

Zeke Susman, Harmonic Drive, EVE5320 Mechatronics, Department of Electrical and Computer Engineering, Utah State University, Mar. 11, 2010, retrieved from the internet on Feb. 18, 2015 from http://mechatronics.ece.usu.edu/ece5320/Schedule/hw01-2010/hw1_Zeke_Susman_a.ppt, 27 pages.

Tom Lipton, Wabble Drive Proof of Principle, Oct. 19, 2012, retrieved from the internet on Feb. 19, 2015 from http://oxtool.blogspot.com/2012/10/wabble-drive-proof-of-principle.html, 8 pages.

Harmonic Drive Systems, Inc., Strengths of HarmonicDrive®, retrieved from the internet on Feb. 18, 2015 from http://www.hds.co.jp/english/company/business/strength/, 5 pages.

Francesco Fasso et al., Conservation of energy and momenta in nonholonomic systems with affine constraints, May 5, 2015, 16 pages.

U.S. Patent and Trademark Office, Non-Final Office Action in U.S. Appl. No. 14/932,901, dated Feb. 23, 2018, 48 pages.

European Patent Office, Extended European Search Report in European Patent Application No. 16156922.3-1806, dated Sep. 30, 2016, 6 pages.

European Patent Office, Extended European Search Report in European Patent Application No. 16196546.2-1762, dated May 3, 2017, 9 pages.

European Patent Office, Extended European Search Report in European Patent Application No. 16194812.0-1762, dated Jun. 7, 2017, 8 pages.

U.S. Patent and Trademark Office, Non-Final Office Action in U.S. Appl. No. 14/989,760, dated Sep. 21, 2017, 40 pages.

European Patent Office, Extended European Search Report in European Patent Application No. 17167409.6-1809, dated Sep. 22, 2017, 9 pages.

U.S. Patent and Trademark Office, Non-Final Office Action in U.S. Appl. No. 15/585,544, dated Jul. 11, 2018, 68 pages.

European Patent Office, Extended European Search Report regarding European Patent Application No. 18169556.0-1012, dated Oct. 5, 2018, 10 pages.

\* cited by examiner

ELLIPTICALLY INTERFACING GEAR ASSISTED BRAKING SYSTEM

FIELD

This disclosure relates to braking. More specifically, the disclosed examples relate to systems and methods for decelerating a rotating object using an elliptically interfacing gear mechanism to dissipate rotational energy.

BACKGROUND

Braking systems are essential to many machines. Frictional brakes are commonly used, such as disc brakes or drum brakes. As indicated in the name, frictional brakes use friction to slow rotational motion. A caliper, lever arm, or other mechanism forces a pad or shoe into frictional contact with a rotating rotor or drum, converting kinetic energy of rotation into thermal energy. Pads and shoes are often short lived components because of heat damage or wear damage, and may require regular replacement.

Aircraft in particular demand high performance from braking systems. Under adverse conditions, the heat generated by traditional braking systems can become unmanageable. Reducing thermal output may mean improved safety and longer lifespan for components. In addition, ensuring passenger safety encourages multiple redundancies in aircraft braking systems, while space and weight are at a premium in aircraft design. Combined, these make a lighter and more compact brake highly desirable.

The present disclosure also relates to elliptically interfacing gear mechanisms of the type known as a wobble plate mechanism. Historically, wobble plate mechanisms have seemed a promising route toward a drive with high torque density. In a wobble plate mechanism, a gear, for example a rotor gear, nutates around another gear, for example a stator gear. Surprisingly, wobble plate mechanisms may also provide a route toward a compact brake, as will be understood in more detail below. Examples of existing wobble plate mechanisms are disclosed in U.S. Pat. Nos. 9,28,1736 and 9,124,150. Older systems are disclosed in U.S. Pat. Nos. 2,275,827 and 3,249,776. The disclosures of these and all other publications referenced herein are incorporated by reference in their entirety for all purposes.

SUMMARY

The present disclosure teaches the combination of a frictional brake with a wobble plate mechanism to provide a compact brake module. The frictional brake is used to activate or deactivate the brake module, but a majority of a braking action is performed by the novel wobble plate mechanism. The combination of the brake and the wobble plate mechanism provide an elliptically interfacing gear assisted braking system. The disclosed system may include an input shaft with a coupled input gear, a wobble plate, a rotor with a reaction gear, and an actuated brake mechanism, or brake. The input gear, wobble plate, and rotor may be annular and the input shaft may extend through each of the input gear, wobble plate, and rotor. The input gear may be disposed opposite the reaction gear, and the wobble plate trapped between the input gear and the reaction gear.

The input shaft may define an axis of rotation and the wobble plate may have a wobble axis disposed at a non-zero angle relative to the rotation axis. A set of face teeth disposed on one surface of the wobble plate may partially mesh with the input gear, and a set of wobble teeth on an opposite surface of the wobble plate may partially mesh with the reaction gear. Rotation of the input shaft may thereby cause rotation of the wobble plate and rotor. The brake may be mounted to an external structure and mate with the rotor. When actuated, the brake may slow the rotor with respect to the input shaft. Rolling contact forces between the surfaces of the wobble teeth and reaction teeth may then induce nutation in the wobble plate, thereby dissipating rotational energy.

The braking system elements described above work well as a module designed to interconnect so that one such brake module can be added to another such brake module. The input shaft may have two ends, a spline at one end and a mating spline at the other end. When two brake modules are aligned along a shared axis of rotation, the spline of one module may mate with the mating spline of the second module. This mating may directly couple the two input shafts so that rotation of the first input shaft may result in rotation of the second input shaft. The input shaft spline may also mate with the wheel of a vehicle, such that the input shaft and the wheel are directly coupled and aligned along a shared axis of rotation.

A method for operating an elliptically interfacing gear assisted braking system may include fixing a rotating object to an input gear, so that the input gear is centered about a shared axis of rotation. The method may include engaging the input gear with a plurality of face teeth on a wobble plate, and engaging a further plurality of wobble teeth on the wobble plate with a reaction gear. The method may further include suspending the wobble plate at a non-zero angle relative to the rotation axis and disposing the reaction gear on a face of a rotor. The method may include braking the rotor and thereby inducing nutation of the wobble plate.

The present disclosure provides various apparatuses and methods of use thereof. In some examples, a braking system may include an input gear, a wobble plate, and a reaction gear. In some examples, braking of the reaction gear may cause the wobble plate to nutate about the reaction gear. In some examples, each of the wobble plate, input gear, and reaction gear may include a set of teeth having shapes designed to limit eccentric forces.

Features, functions, and advantages may be achieved independently in various examples of the present disclosure, or may be combined in yet other examples, further details of which can be seen with reference to the following description and drawings.

BRIEF DESCRIPTION OF THE DRAWINGS

Please note that the relative scale differs between sheets of drawings, so that various details in the drawings are more readily apparent.

DESCRIPTION

Various examples of apparatuses and methods relating to an elliptically interfacing gear assisted braking system are described below and illustrated in the associated drawings. Unless otherwise specified, an apparatus or method and/or their various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar apparatuses or methods. The following description of various examples is merely exemplary in nature and is in no way intended to limit the disclosure, its application, or uses. Additionally, the advantages provided by the examples, as described below, are illustrative in nature and not all examples provide the same advantages or the same degree of advantages.

Figure 1:
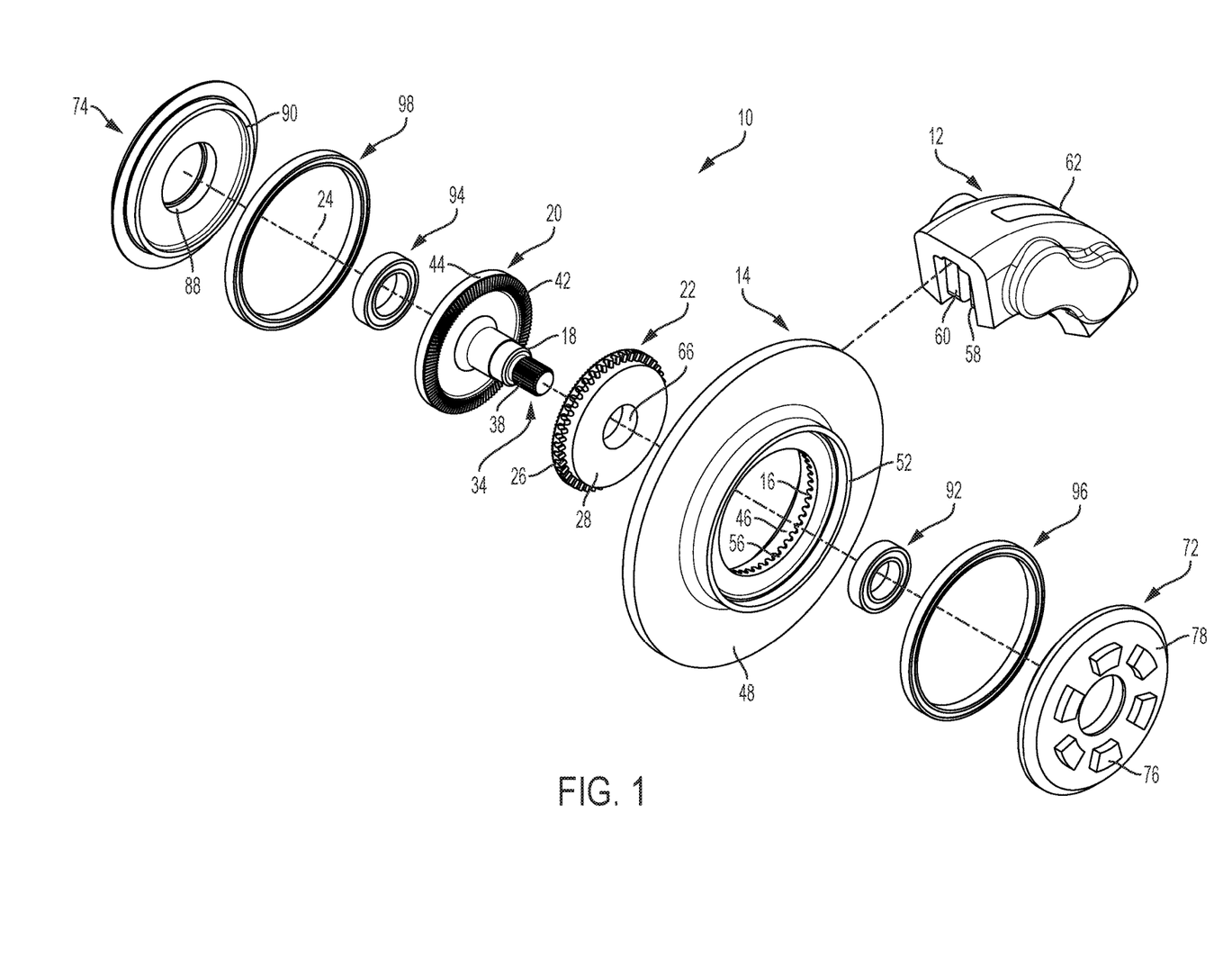
FIG. 1 is an isometric exploded view of components of a brake module assembly according to the present disclosure.
Figure 2:
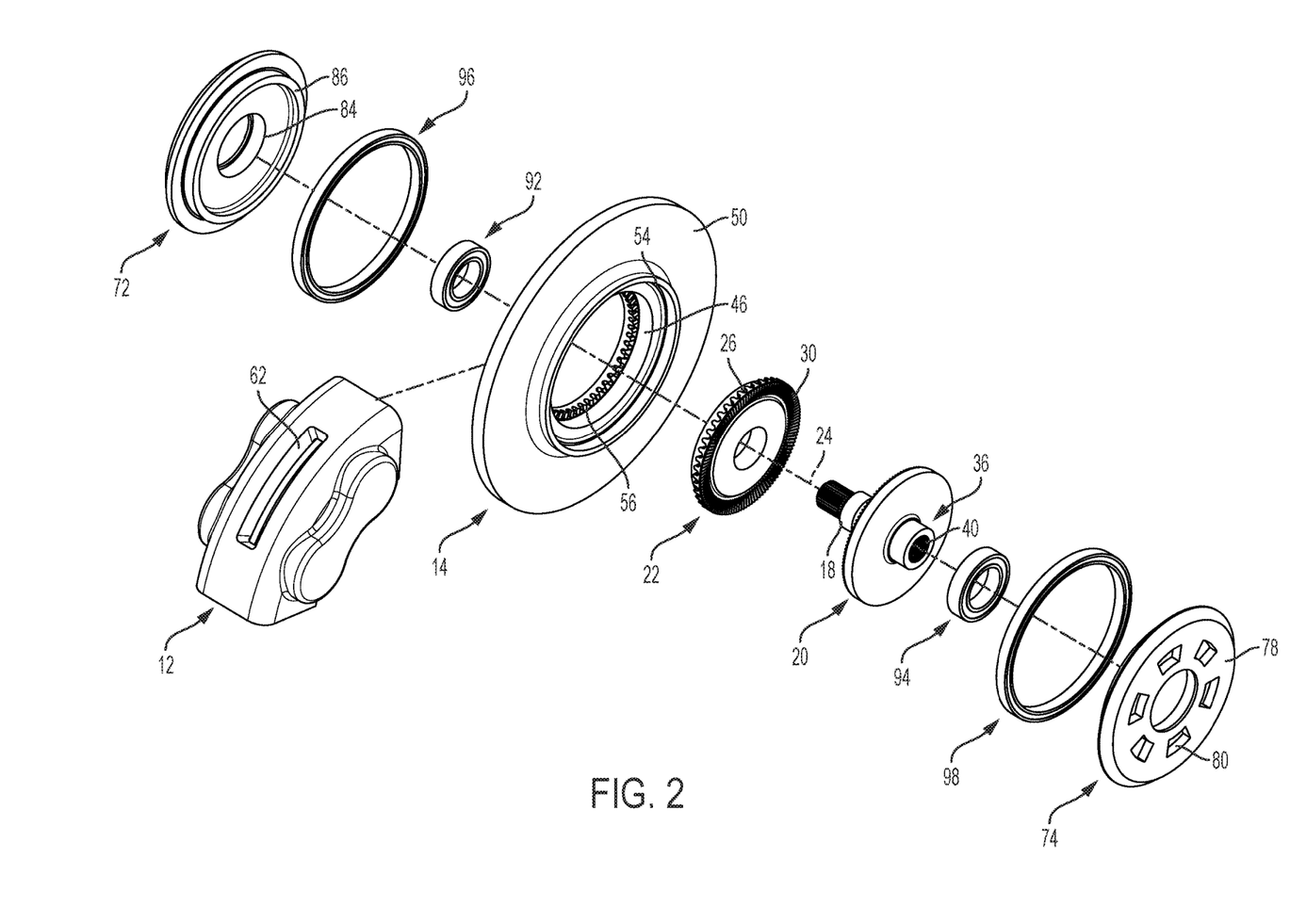
FIG. 2 is an isometric exploded view of the components shown in FIG. 1, viewed from an opposite direction.

An example of this braking system or brake module can be seen from different angles in FIGS. 1 and 2, with a brake module generally indicated at 10. Brake module 10 may include a brake 12, an annular brake rotor 14 including reaction gear 16, an input shaft 18, an input gear 20, and an annular wobble plate 22. The input shaft may extend through rotor 14 and input gear 20, with input gear 20 opposite reaction gear 16. Wobble plate 22 may be disposed between input gear 20 and reaction gear 16.

Input shaft 18 may define an axis of rotation 24, about which input gear 20 may be centered. Rotor 14 and reaction gear 16 may be similarly concentric with rotation axis 24.

Wobble plate 22 may have both a set of wobble teeth 26 disposed on a front face 28 and a set of face teeth 30 disposed on an opposing rear face 32. Wobble plate 22 may be aligned at a non-zero angle with respect to the axis of rotation 24 such that the wobble plate meshes partially with both input gear 20 and reaction gear 16. Rotation of input shaft 18 may thereby cause wobble plate 22 to rotate.

Brake 12 may comprise a brake caliper, as shown, that selectively controls a braking action. The brake may mate with rotor 14, allowing a braking action by the brake to slow the rotor relative to input shaft 18 and thereby induce a nutation of wobble plate 22 relative to the rotor, dissipating rotational energy.

Figure 8:
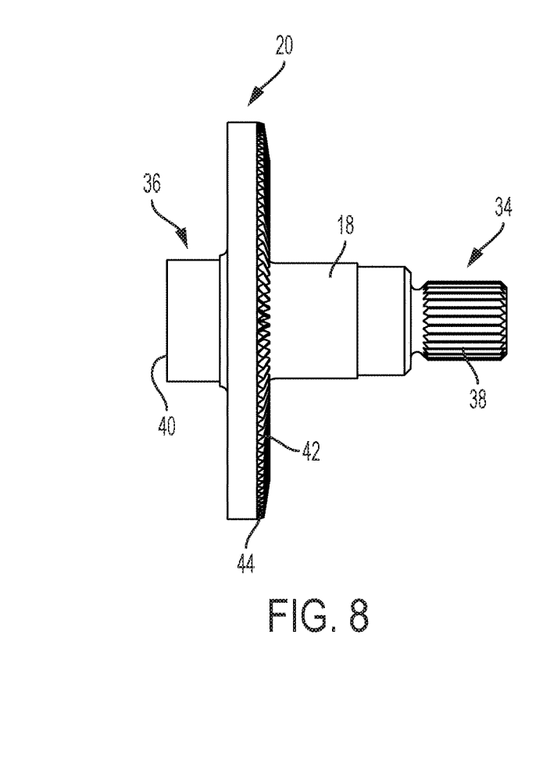
FIG. 8 is a side view of an input shaft shown in FIGS. 1-4.
Figure 9:
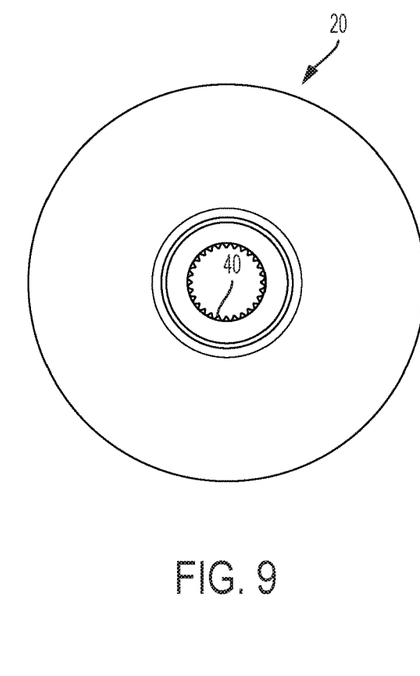
FIG. 9 is a rear view of the input shaft shown in FIG. 8.
Figure 10:
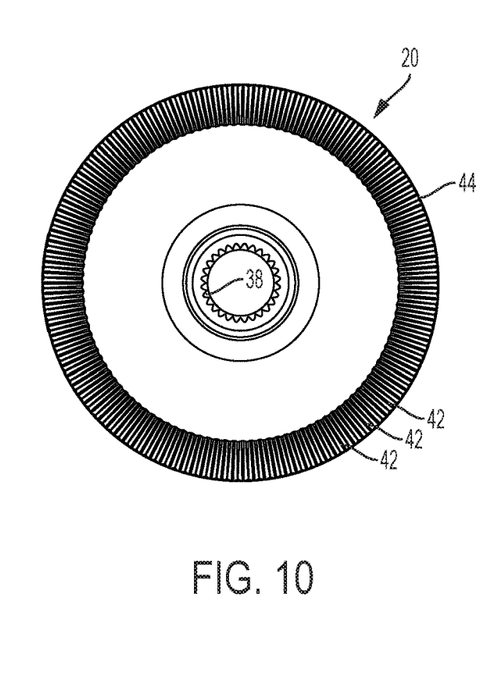
FIG. 10 is a front view of the input shaft shown in FIGS. 8-9.

Input shaft 18 may extend through input gear 20 and be directly coupled to the input gear, such that the input shaft forms an integral part of the input gear. In other examples, not shown, the input gear may be formed as a separate part, and then coupled to the input shaft. Thus, a single rotation of input shaft 18 may result in a single rotation of input gear 20. FIGS. 8-10 show side, front, and rear views of input gear 20.

Input shaft 18 may comprise a first end 34, a second end 36, and circular cross section best seen in FIG. 9. A spline, or male spline 38 may be located at the first end 34 of input shaft 18 and a mating spline, or female spline 40 may be located at the second end 36 of input shaft 18. Input shaft 18 may thereby be shaped to mate with a second input shaft to interconnect multiple brake modules as an assembly.

Input gear 20 may comprise a plurality of input teeth 42 disposed on an annular input surface 44, best seen in FIG. 10. Input surface 44 may be frustoconical. That is, annular input surface 44 may be angled relative to a plane perpendicular to the rotation axis 24, so that every point on the annular input surface includes a frustoconical line that can be extended to a vertex located on the rotation axis and forward of input gear 20. When the above-recited elements are assembled into a brake module 10, the frustoconical vertex of annular input surface 44 may be proximate a center of mass of wobble plate 22.

A count of the plurality of input teeth 42 may be any appropriate number. In the example depicted in FIGS. 1 and 2, there are 115 input teeth. Each input tooth may include two driving faces and each driving face may be planar, composed of more than one plane, or may be composed of one or more surfaces with curvature.

Figure 11:
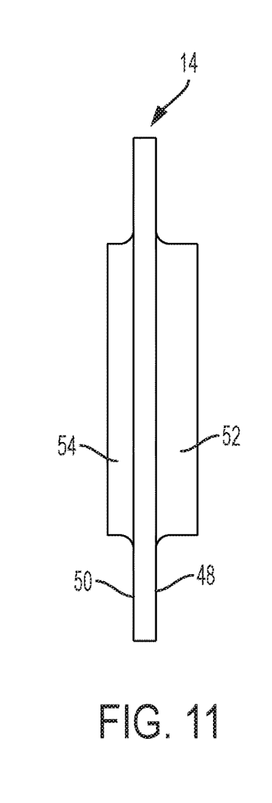
FIG. 11 is a side view of a rotor shaft shown in FIGS. 1-4.
Figure 12:
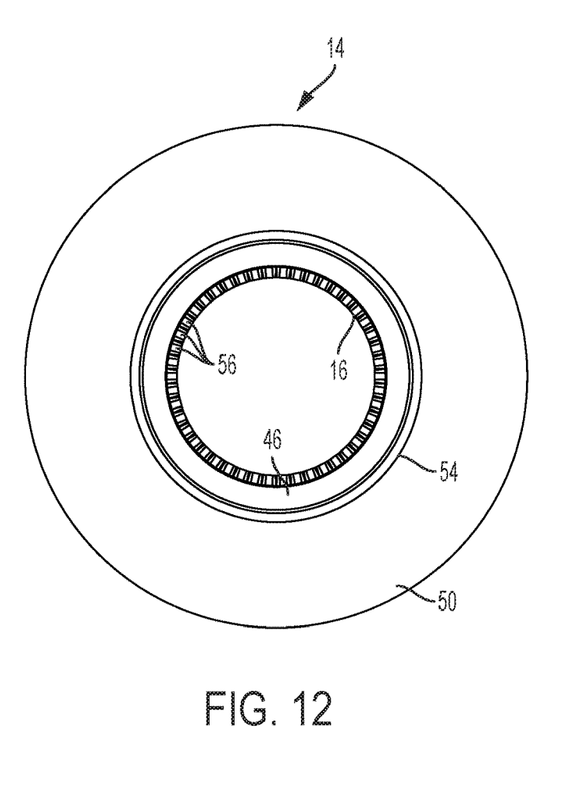
FIG. 12 is a rear view of the rotor shown in FIG. 11.
Figure 13:
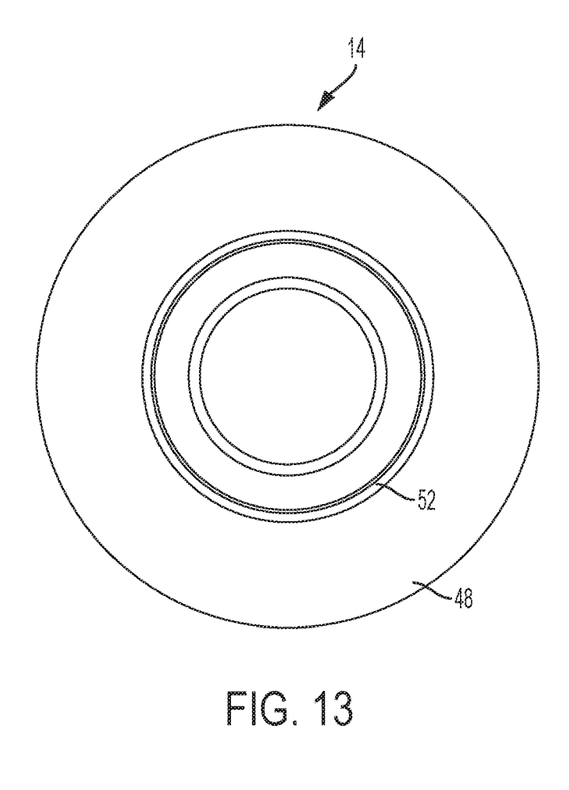
FIG. 13 is a front view of the rotor shown in FIGS. 10-11.
Figure 14:
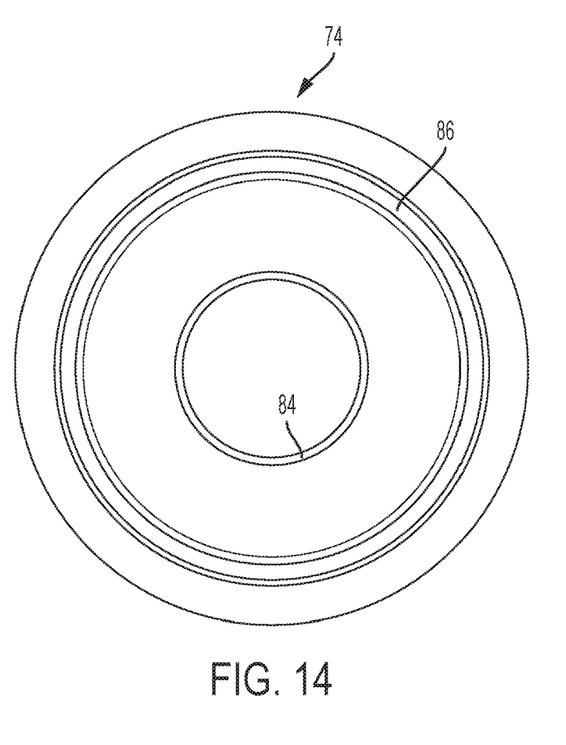
FIG. 14 is a front view of a rear housing shown in FIGS. 1-4.

Rotor 14 may be annular in shape, with a cylindrical inner surface comprising gear face, or reaction face 46. The reaction face may partially define an interior volume that may be configured to accommodate some or all of wobble plate 22. FIGS. 11-13 show side, rear, and front views of rotor 14.

Rotor 14 may also comprise a front surface 48 and a rear surface 50. A front bearing collar 52 may be disposed on front surface 48, proximate reaction face 46 and a rear bearing collar 54 may be disposed on rear surface 50, also proximate the reaction face. Rotor 14 may be rotatably mounted on input shaft 18, so that it is coaxial with axis of rotation 24.

Reaction gear 16, comprised of a plurality of reaction teeth 56, may be disposed on reaction face 46. The plurality of reaction teeth 56 may extend toward rear bearing collar 54, parallel to axis of rotation 24. A count of the reaction teeth 56 may be any appropriate number. In the example shown in FIGS. 1 and 2, there are 46 reaction teeth.

Each tooth of the plurality of reaction teeth 56 may have a proximal end and a distal end relative to the rotation axis 24, as shown in FIGS. 1 and 2. The distal end of each reaction tooth 56 may be coupled to the reaction face 46. Each tooth may also include a first engaging surface and on the opposite side of the tooth may be a second engaging surface. Each engaging surface may be planar, composed of more than one plane, or composed of one or more surfaces with curvature.

One or both engaging surfaces of a reaction tooth 56 may be defined by a compound involute of a circle and an ellipse, as previously outlined. Alternately, the curve may be the projection of a virtual ellipse onto the tooth location for all angles between 0 and $2\pi$ radians.

Each tooth of the plurality of reaction teeth 56 may include an engaging portion and a supporting base. The engaging portion may include the first engaging surface and the second engaging surface. The supporting base may couple the engaging portion to the rotor.

Also shown in FIGS. 1 and 2, Brake 12 may include a brake caliper or other braking mechanism capable of slowing rotor 14 relative to input shaft 18. Brake 12 may be fixed to an external structure or otherwise mounted so that the brake is mated with the rotor. In the case of an example where the brake includes a brake caliper 62, a front brake pad 58 may be fixed proximate rotor front surface 48 and a rear brake pad 60 may be fixed proximate rotor rear surface 50. When urged by brake caliper 62, the front brake pad and the rear brake pad may make frictional contact with a corresponding front surface 48 and rear surface 50 of rotor 14 in order to selectively brake rotation and slow the rotor relative to input shaft 18.

Under certain conditions, loss of traction may occur between brake 12 and rotor 14. For example, if the torque applied to input shaft 18 exceeds a product of force exerted on rotor 14 by brake pads 58, 60 and a frictional coefficient appropriate to materials of the brake pads and the rotor, and distance from axis of rotation 24 to a point of contact between the brake pads and the rotor, then slipping may occur. Under such conditions, brake module 10 will release the torque load. That is, rotation of rotor 14 may be restricted, but not prevented. Some rotational energy of input shaft 18 may be dissipated by nutation of the wobble plate, while remaining rotational energy may be transmitted to the rotor.

Figure 5:
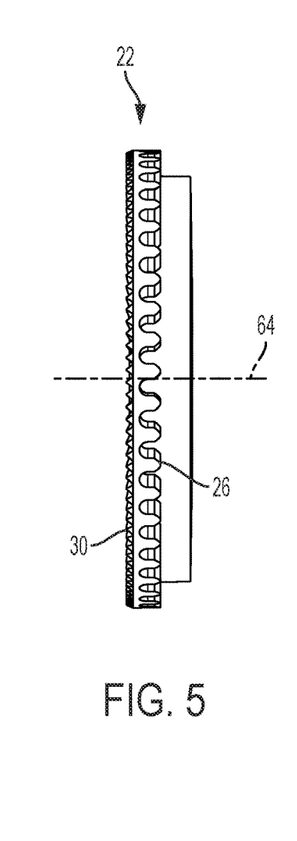
FIG. 5 is a side view of a wobble plate shown in FIGS. 1-4.
Figure 6:
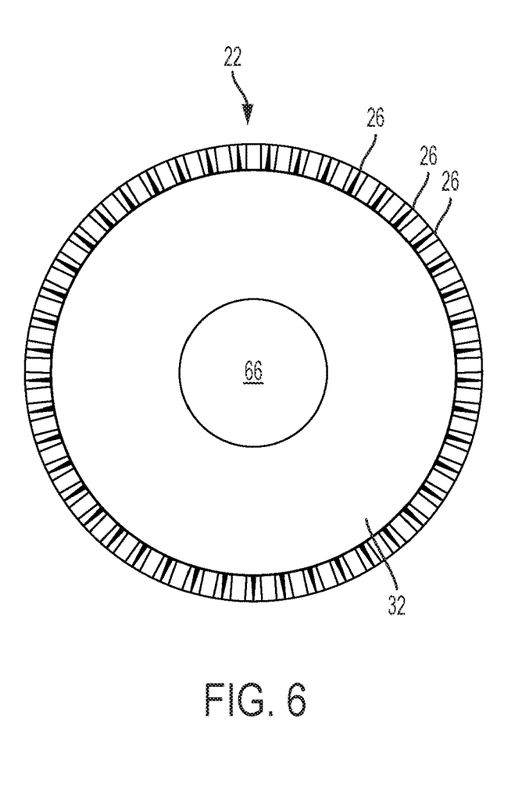
FIG. 6 is a front view of the wobble plate shown in FIG. 5.
Figure 7:
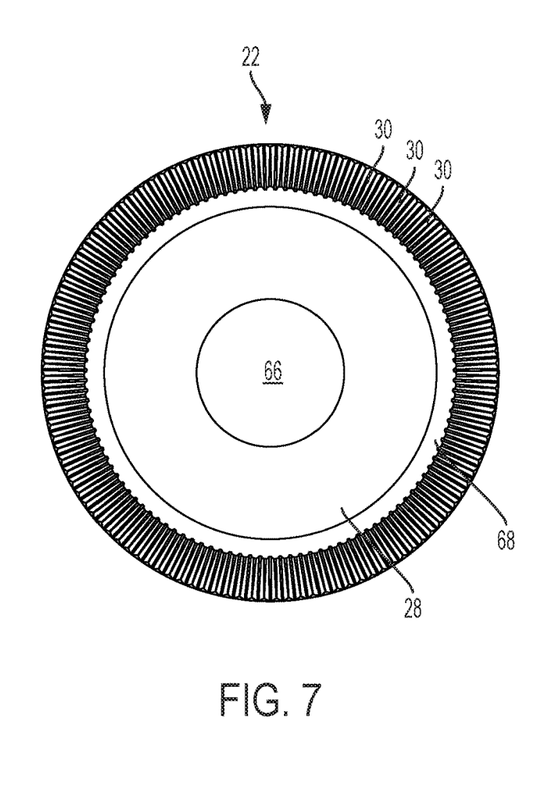
FIG. 7 is a rear view of the wobble plate shown in FIGS. 5-6.

Referring again to FIGS. 1 and 2, wobble plate 22 may be annular in shape, with a front face 28, a rear face 32 and a central axis, or wobble axis 64. Central aperture 66 of wobble plate 22 may be configured to receive a portion of input shaft 18, see for example in FIG. 3. Wobble plate 22 may be aligned such that wobble axis 64 forms a non-zero angle with the axis of rotation 24. FIGS. 5-7 show side, front, and rear views of wobble plate 22.

As shown in FIG. 7, rear face 32 may include an annular wobble surface 68, which may be a frustoconical surface. That is, annular wobble surface 68 may be angled relative to a plane perpendicular to wobble axis 64, so that every point on the annular wobble surface includes a frustoconical line that can be extended to a frustoconical vertex located on the wobble axis. The frustoconical vertex of annular wobble surface 68 may be proximate a center of mass of wobble plate 22.

A plurality or set of face teeth 30 may be disposed on annular wobble surface 68. A count of the face teeth 30 may be any appropriate number. The count of face teeth may be more, less, or the same as a count of the plurality of input teeth 42. In the example depicted in FIG. 7 there are 115 face teeth. Each face tooth may include two driven faces, which may be planar, composed of more than one plane, or may be composed of one or more surfaces with curvature.

Figure 3:
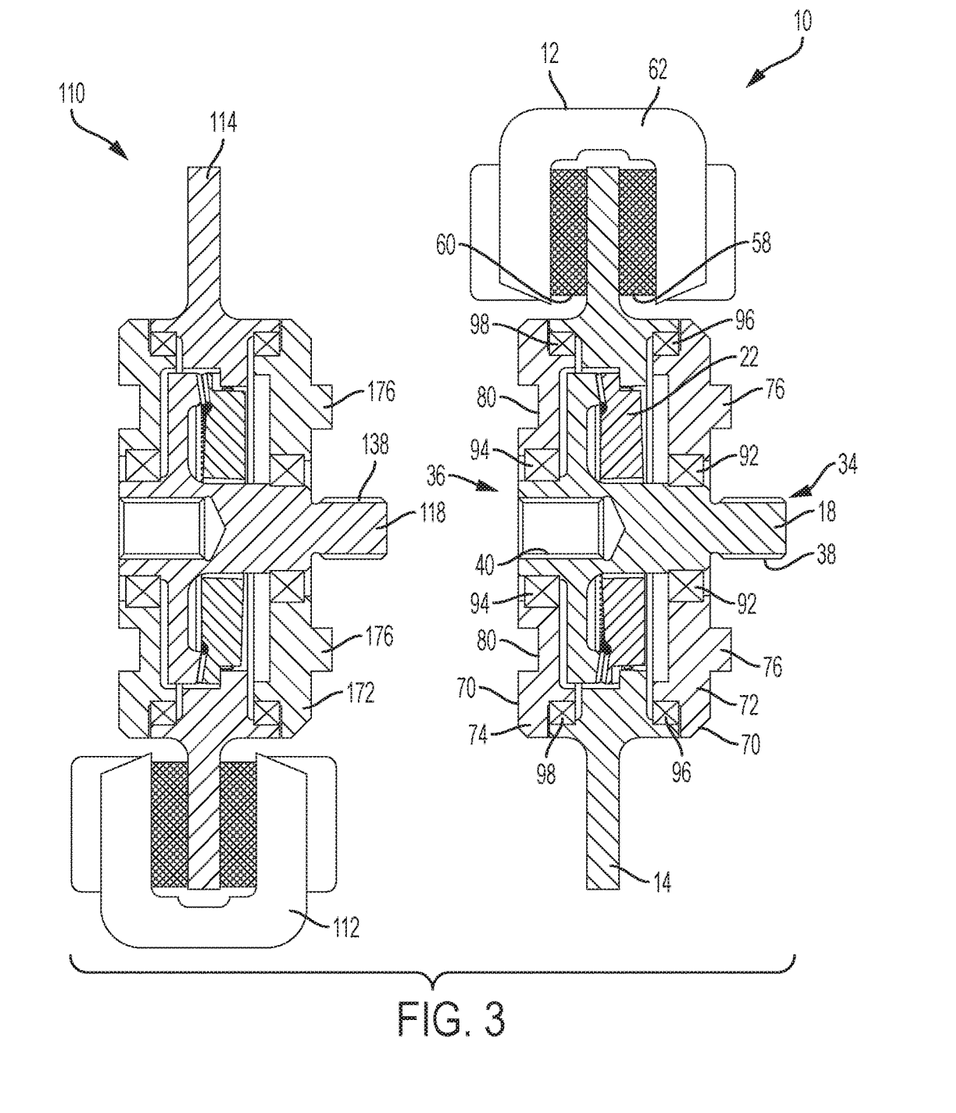
FIG. 3 is a cross-section view of two brake module assemblies of the type shown in FIGS. 1-2, adjacent to one another.

Wobble plate 22 may engage with input gear 20, as depicted in FIG. 3. The engagement may be between the plurality of face teeth and input teeth. When the input gear rotates in a given rotation direction a driving face of an input tooth may engage with a driven face of a face tooth. That is, there may be a contact force exerted on the wobble plate by the input plate through an interaction between the driving faces of the plurality of input teeth and the driven faces of the plurality of face teeth. These contact forces may cause the wobble plate to rotate in the same given rotation direction.

In the example of brake module 10, input gear 20 has 115 input teeth and wobble plate 22 has 115 face teeth. That is, the input gear and the wobble plate interact and rotate according to a gear ratio of 1:1. That is, for every single complete rotation of the input gear, the wobble plate also completes exactly one complete rotation. Other choices for the numbers of input and face teeth are possible, and would result in a different gear ratio.

Wobble plate 22 and input gear 20 may be configured so that any contact forces exerted between the wobble plate and the input gear will point in directions that are tangent to circles which lie in planes perpendicular to the rotation axis. By configuring the wobble plate and input gear so that contact forces between the wobble plate and the input gear point in such directions, eccentric forces may be avoided. Eccentric forces may cause the plurality of face teeth 30 to disengage from the plurality of input teeth 42 or may cause the center of mass of the wobble plate to oscillate, thereby introducing undesirable vibrations into the brake module system.

Wobble plate 22 may further comprise a plurality or set of wobble teeth 26, disposed on front face 28. The wobble teeth may extend from front face 28 in an axial direction along the wobble axis. A count of the wobble teeth 26 may be any appropriate number. The count of the wobble teeth may be more, less, or the same as a count of the reaction teeth 56. In the example shown in FIG. 6, there are 45 wobble teeth.

Each wobble tooth 26 may include a first engaging surface and on the opposite side of the tooth may be a second engaging surface. Each surface may be planar, composed of more than one plane, or composed of one or more surfaces with curvature.

One or both engaging surfaces of a wobble tooth 26 may be defined by a compound involute of a circle and an ellipse, as previously outlined. Alternately, the curve may be the projection of a virtual ellipse onto the tooth location for all angles between 0 and $2\pi$ radians.

Additionally, each wobble tooth 26 may include an engaging portion and a supporting base. The engaging portion may include the first engaging surface and the second engaging surface. The supporting base may connect the engaging portion to front face 28 of wobble plate 22.

Wobble plate 22 may engage with reaction gear 16, as depicted in FIG. 3. The engagement may be between the plurality of wobble teeth 26 and reaction teeth 56. If wobble plate 22 rotates in a given rotation direction, then the first engaging surface of a wobble tooth 26 may engage with the first engaging surface of a reaction tooth 56. That is, there may be a contact force exerted on reaction gear 16 by wobble plate 22 through an interaction between the first engaging surfaces of the plurality of wobble teeth and the first engaging surfaces of the plurality of reaction teeth.

In a case where brake 12 is not engaged in a braking action on rotor 14, reaction gear 16 may be free to rotate. The contact force between the wobble teeth 26 and reaction teeth 56 may then cause reaction gear 16 and rotor 14 to rotate in the given rotation direction.

In a case where brake 12 is engaged in a braking action on rotor 14, rotation of the rotor may be slowed relative to input shaft 18 and rotation of reaction gear 16 may be restricted or prevented. The contact force between the wobble teeth 26 and the reaction teeth 56 may then cause wobble plate 22 to nutate.

In the example of brake module 10, reaction gear 16 has 46 reaction teeth and wobble plate 22 has 45 wobble teeth. As wobble plate 2 nutates around reaction gear 16, each wobble tooth 26 may engage with one tooth in the plurality of reaction teeth 56 during a single nutation. As there may be one more reaction teeth than wobble teeth, the wobble plate may rotate slightly during a single nutation. In the example of brake module 10, the wobble plate may rotate $1/46^{th}$ of a complete rotation during a single nutation of the wobble plate. In other words, if the wobble plate rotates by $1/46^{th}$ of a complete rotation, perhaps due to an interaction with the input gear, the wobble plate may complete one full nutation. Thus, the wobble plate and the reaction gear may interact according to a gear ratio of 46:1. For every 46 nutations of the wobble plate, the wobble plate may rotate exactly once. Other choices for the numbers of reaction teeth and wobble teeth are possible, and would result in a different gear ratio.

Wobble plate 22 and rotor 14 may be substantially circular in shape, with a projection of the wobble plate onto the rotor being elliptical in shape. The pluralities of wobble teeth 26 and reaction teeth 56 may be contoured by projecting this virtual ellipse onto the tooth location. The elliptical projection of wobble plate 22 onto rotor 14 may thereby be constrained to non-eccentric rotation. Eccentric motion, if allowed, may drive large imbalance forces creating unacceptable system performance For each tooth of both pluralities of wobble teeth 26 and reaction teeth 56, one or both of the first engaging surface and second engaging surface may be defined by a compound involute of a circle and an ellipse. That is, the curve of the second engaging surface may be defined by a first equation:

$$y=C(\tan(\varphi)-\varphi)^D$$

where C is a constant which may be proportional to a radius of the wobble plate, $\varphi$ may take values from 0 to $$\frac{\pi}{2}$$

radians, and D may have be a positive constant less than 1. D may have a value of approximately 0.65, though other values are also possible. The first equation may be normalized to unity.

Alternately, the curve of the second engaging surface may be defined by a second equation:

$$y=C(\sin(\varphi)-\varphi\cos(\varphi))^D$$

where C is a constant which may be proportional to a radius of the wobble plate, $\varphi$ may take values from 0 to $$\frac{\pi}{2}$$

radians, and D may have be a positive constant less than 1. D may have a value of approximately 0.65, though other values are also possible. The second equation may be normalized to a radius of the reaction gear. The curve of the second engaging surface may be the projection of a virtual ellipse onto the tooth location for all angles between 0 and $2\pi$ radians.

The curve of the first engaging surface may be a mirror image of the curve of the second engaging surface, reflected across a plane through the apex of the tooth and containing the axis of rotation. Also, the first engaging surface and the second engaging surface may meet smoothly at the apex of each tooth. The cross-sectional shape of the tooth may therefore be defined by a compound involute of a circle and an ellipse.

The brake module may be understood as a mechanically constrained system governed by Euler's equations for a wobbling plate, which create a rotating inertial reference frame. Consider Euler's z-axis equation, $$T_z=I_z\dot{\omega}_z-(I_x-I_y)\omega_x\omega_y$$

where T is torque, I is moment of inertia, and $\omega$ is angular velocity. This equation shows that depending on the direction of torque, an axis will experience an opposing rotation. Torque, or kinetic energy, may enter the system and be accepted as opposing rotations. No net momentum is stored, and all input energy may be used in changing a momentum vector of wobble plate 22.

As previously described, wobble teeth 26 and reaction teeth 56 may be configured to provide a mechanical constraint on motion of wobble plate 22. A relationship between input rotational torque, kinetic energy of wobble plate 22, and rotating strain torque of rotor 14 under that mechanical constraint may be expressed as $$\sin(2\theta)T_z=I_z\dot{\omega}_z-I_x\omega_z^2$$

where $\theta$ is the angle between wobble axis 64 and rotation axis 24, and $T_z$ is torque input by rotation of input gear 20.

Two further factors may contribute, torque ratio and friction. Torque ratio is an outcome of an Euler requirement that for every $4\theta$ of nutation, wobble plate 22 must also rotate by one wobble tooth 26. Gear ratio may be converted to torque ratio by dividing nutation by the rotational increment represented by the gear ratio, or angular width of one wobble tooth. The torque ratio of the system may be written as $$\frac{4\theta}{2\pi}GR$$

where GR is the gear ratio between reaction gear 16 and wobble plate 22.

Due to a linear relationship with velocity, friction may scale with angular velocity of wobble plate 22. A governing equation for the system may be written as $$\sin(2\theta)T_z\left(1-\mu\left(\frac{4\theta}{2\pi}GR\right)\omega_z\right)=I_z\dot{\omega}_z+I_x\left(\frac{4\theta}{2\pi}GR\right)\omega_z^2$$

where $\mu$ is an appropriate coefficient of friction between wobble teeth 26 and reaction teeth 56.

The brake module system may also be considered in terms of the virtual ellipse formed by projecting the wobble plate onto the rotor. Wobble plate 22 and rotor 14 may have generally one point of contact. An edge of the virtual ellipse may define in three dimensions a continuous line of contact of the elliptically interfacing wobble plate and rotor. The shape of the virtual ellipse may remain unchanged under a nutation of the wobble plate that encompasses four times the angle between the wobble axis 64 and rotation axis 24. Only the rotational frame of the line of contact, defined by Euler, may advance as the nutation occurs. Each point on the line of contact may fall on a compound geometrically distorted involute function, and the function may be symmetric under both rotation and nutation, allowing continuous energy transfer to and from the virtual ellipse.

The virtual ellipse may be static as the inertial frame rotates, with all points on the line of contact rotating in their own horizontal plane at a constant angular rate. A point on a radial edge of wobble plate 22 viewed during nutation may exhibit vertical motion with a constantly changing velocity.

This change in velocity may require constant acceleration of the inertia of the wobble plate, absorbing kinetic energy input to the system.

Referring again to FIGS. 1 and 2, Brake module 10 may further comprise a housing 70 to facilitate installation, support the continued correct placement of and interface between parts, and protect the gear mechanisms from external influences. Any housing appropriate to the intended use of the brake module may be used, in some cases allowing connection of a further plurality of brake modules.

Figure 4:
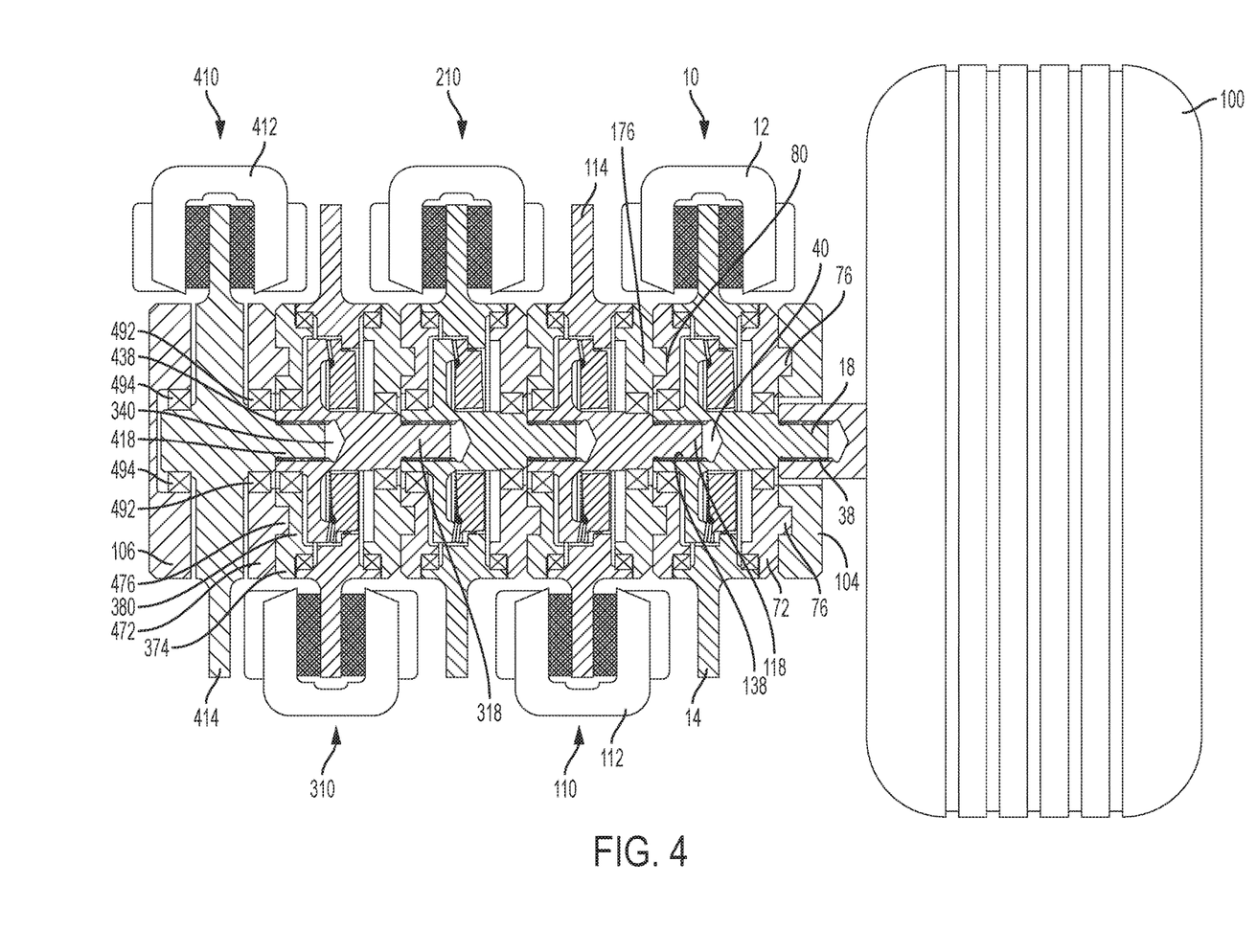
FIG. 4 is a cross-section view of a portion of an airplane, including a service brake, four brake module assemblies of the type shown in FIGS. 1-2, a hub, and a wheel, shown assembled.
Figure 15:
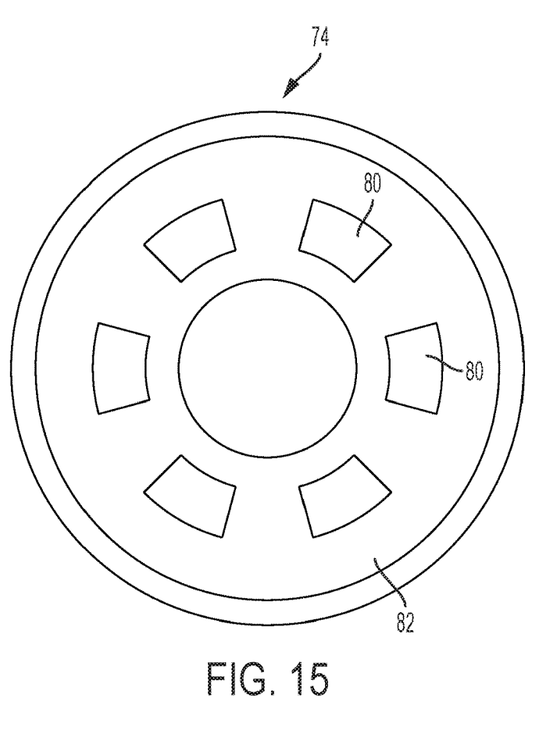
FIG. 15 is a rear view of the rear housing shown in FIG. 14.
Figure 16:
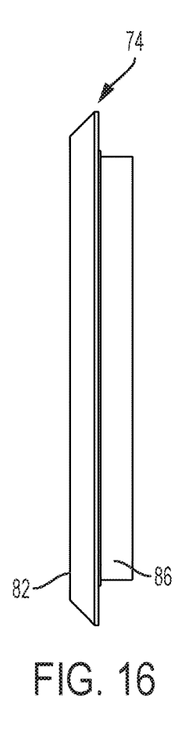
FIG. 16 is a side view of the rear housing shown in FIGS. 14-15.

Housing 70 may comprise a front housing 72 and a rear housing 74, each with an annular shape appropriate to accommodate an end of input shaft 18. Front housing 72 may include one or more locking lugs 76 extending from its front, or mating face 78, which can be best seen in FIGS. 17 and 18. Rear housing 74 may include a corresponding number of lug sockets 80 recessed in its rear, or mating face 82, which can be seen in FIG. 15. Locking lugs 76 and lug sockets 80 may correspond in shape and location. Furthermore, Locking lugs 76 and lug sockets 80 face in opposite directions, so that a front housing 72 may mate with a corresponding rear housing 74, when two similar brake modules are connected together, as shown in FIG. 4.

Figure 17:
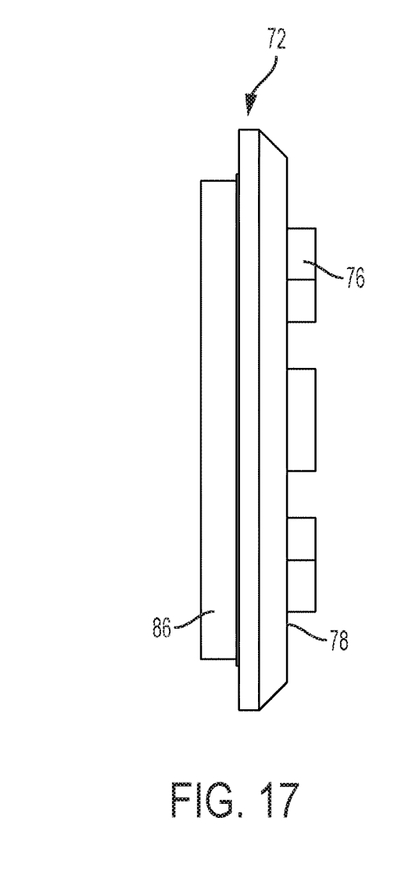
FIG. 17 is a side view of a front housing shown in FIGS. 1-4.
Figure 18:
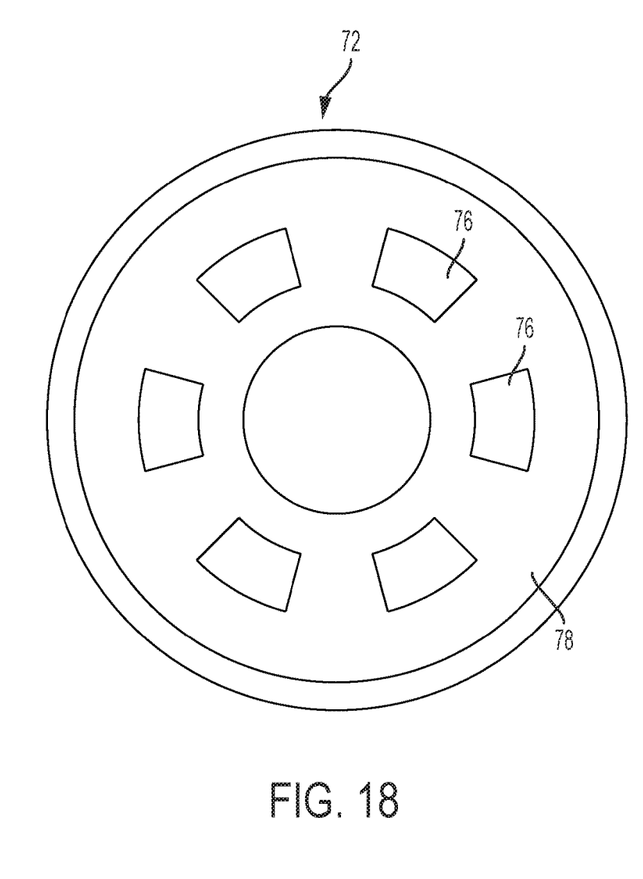
FIG. 18 is a front view of the front housing shown in FIG. 17, with a rear view of the front housing being similar to FIG. 14.

Front housing 72 may further comprise a second face with an inner bearing collar 84 and an outer bearing collar 86. Rear housing 74 may also comprise an inner bearing collar 88 and outer bearing collar 90 on a second face.

Referring again to FIGS. 1 and 2, an annular front shaft bearing 92 of appropriate size may be mounted on input shaft 18. Front shaft bearing 92 may be mounted proximate the first end 34 of input shaft 18 and male spline 38. Front housing 72 may be mounted on front shaft bearing 92 such that the bearing fits within front housing inner bearing collar 84.

An annular rear shaft bearing 94 of appropriate size may also be mounted on input shaft 18. Rear shaft bearing 94 may be mounted proximate the second end 36 of input shaft 18 and female spline 40. Rear housing 74 may be mounted on rear shaft bearing 94 such that the bearing fits within rear housing inner bearing collar 88.

A front rotor bearing 96 may be mounted on the front housing 72 such that the bearing fits around the front housing outer bearing collar 86. A rear rotor bearing 98 may be mounted on the rear housing 74 such that the bearing fits around the rear housing outer bearing collar 90. The front rotor bearings and the rear rotor bearings may each have an annular shape appropriate to mate with a corresponding bearing collar on rotor 14.

Rotor 14 may then be mounted on both front rotor bearing 96 and rear rotor bearing 98, such that the front rotor bearing fits within front bearing collar 52 of the rotor and the rear rotor bearing fits within rear bearing collar 54 of the rotor.

In some examples, front housing 72 may be mounted proximate the first end 34 of input shaft 18 and male spline 38. The rear housing 74 may be mounted proximate the second end 36 of the input shaft and the female spline 40. Front rotor bearing 96 may then be mounted on front housing 72 and rear rotor bearing 98 may be mounted on rear housing 74. Rotor 14 may then be mounted on front rotor bearing 96 and rear rotor bearing 98.

In other examples, first annular housing 72 may be mounted on first annular bearing 92, and shaped to conform to a first corresponding portion of annular brake rotor 14, and second annular housing 74 may be mounted on second annular bearing 94, and shaped to conform to a second corresponding portion of annular brake rotor 14.

For example, front housing 72 and rear housing 74 may each include a flat portion at a radial edge corresponding in length to a raised area on rotor 14. When assembled, the flat portions of the housings may abut the raised area of rotor 14 without making contact, but closely enough to inhibit admission of dust or grit.

When brake module 10 is assembled as shown in FIG. 3, wobble plate 22 may be enclosed in an annular cavity defined by: front housing 72, front shaft bearing 92, front rotor bearing 96, rotor 14, input shaft 18, rear rotor bearing 98, rear shaft bearing 94, and rear housing 74. Wobble plate 22 may be trapped between rotor 14 and input shaft 18. A radial edge of rotor 14 may extend beyond the front housing and the rear housing in order that brake 12 may mate with the rotor.

Front housing 72 may define a plane perpendicular to axis of rotation 24 and parallel to a substantially flat extent of mating face 78. Rear housing 74 may similarly define a plane parallel to an extent of mating face 82. Rotor 14 and wobble plate 22 may be disposed between the plane of front housing 72 and the plane of rear housing 74.

A shown in FIG. 3, the planes of front housing 72 and rear housing 74 may define a volume that extends from one radial edge to an opposite radial edge of each housing. Brake 12 may mate with rotor 14 external to the volume so defined. Any extent of brake 12 in the axial direction from a point of contact with rotor 14 may be limited to less than twice the distance axially from the point of contact to the plane of rear housing 74.

Also shown in FIG. 3 is a second brake module 110 that may be connected to brake module 10. Elements of second brake module 110 are labeled using reference characters similar to those used above, but with a "1" added. Thus, a male spline 138 of module 110 may mate with female spline 40 of module 10. This mating may directly couple the two input shafts so that a single rotation of input shaft 18 may result in a single rotation of input shaft 118.

The two modules may be mutually oriented in a manner allowing locking lugs 176 on front housing 172 of module 110 to mate with the corresponding lug sockets 80 of rear housing 74 of module 10, locking the two housings together.

Brake 112 of the module 110 may mate with rotor 114 radially opposite brake 12 of module 10, with respect to a shared axis of rotation. As depicted in FIG. 4, this orientation may allow rotor 14 to rotate without interference from brake 112, and similarly allow rotor 114 to avoid interference from brake 12.

A further plurality of modules may be connected as described to form an assembly. A module may also be similarly connected to other mechanisms involved in braking. A module or plurality of modules may be connected to a rotating object for the purpose of decelerating the object.

Referring to FIG. 4, an assembly of brake modules is shown installed in an airplane. Four similar brake modules are shown, connected as described above. As before, elements of a third brake module 210 are labeled using reference characters similar to those used above, but with a "2" added. Similarly, elements of a fourth brake module 310 are labeled using reference characters similar to those used above, but with a "3" added. The assembly may be installed in an aircraft or vehicle of any kind where it would be advantageous to provide braking with minimal thermal output.

Male spline 38 of input shaft 18 of a brake module 10 may be mated to a corresponding structure on a wheel 100 that movably supports an airplane. Input shaft 18 and the wheel 100 may be thereby coupled to rotate coaxially around an axis of rotation defined by the wheel. The wheel 100 may be attached to an airframe or other portion of the airplane, and brake 12 of module 10 may also be attached to the airframe.

Male spline 138 of input shaft 118 of a brake module 110 may be mated to female spline 40 of input shaft 18 of module 10. Brake 112 may be mounted to the airframe at a position radially opposite brake 12, and mated with rotor 114 to selectively brake rotation of the rotor relative to wheel 100. Locking lugs 176 of front housing 172 of module 110 may lock with lug sockets 80 of rear housing 74 of module 10. Brake modules 210 and 310 may be similarly connected, and all four input shafts may rotate coaxially with the wheel 100.

A service shaft 418 with male spline 438 may further be mated to female spline 340 of input shaft 318 of module 310. Service shaft 418 may thereby be operatively fixed to the wheel 100 concentric with the shared rotation axis. A service rotor 414 may be fixed to service shaft 418, and a service brake 412 may be attached to the airframe in such a way that the brake may mate with the service rotor. Selective braking action by brake 412 may stop rotation of rotor 414 and thereby stop rotation of the wheel 100.

A front service shaft bearing 492 and rear service shaft bearing 494 may be mounted on service shaft 418. A front service housing 472 may be mounted on front service shaft bearing 492, and the front service housing's front surface 478 may have locking lugs 476 corresponding to lug sockets 380 on rear housing 374 of brake module 310. Front service housing 472 may be thereby locked to rear housing 374 of brake module 310.

As depicted in FIG. 4, an outer housing may be provided to enclose service shaft 418 and plurality of braking module input shafts. A front outer housing 106 may be annular in shape, with an inner radius appropriate to accommodate the mating of male spline 38 of brake module 10 and corresponding structure on the wheel 100. The outer radius may match that of housing 70 of module 10, or be any other appropriate size. A rear surface of front outer housing 106 may have recessed lug sockets corresponding to locking lugs 76 on mating face 78 of front housing 72 of module 10. Front outer housing 106 may be thereby locked to front housing 72, and located between module 10 and the wheel 100.

A rear outer housing 108 may be cylindrical in shape, with a central recess to accommodate the unmated end of the service shaft. Rear outer housing 108 may be mounted on rear service shaft bearing 494. The outer radius of housing 108 may match that of front outer housing 106, or be any other appropriate size. Additional features or alternative shapes may be used to facilitate installation of the assembly.

In an alternative example, not shown, brake 12 may comprise a band brake. A loop of frictional material may be adjustably attached to an external mount, wherein actuation of the brake shortens the length of the loop. The loop of frictional material may be disposed proximate a radial outer edge of rotor 14, and encircling a majority of the circumference of the rotor. Actuation of the brake may thereby bring the material of the loop into frictional contact with the radial edge of rotor 14, slowing the rotor with respect to input shaft 18.

Similar variations could create yet another example, substituting some other type of brake mechanism that can operate directly on brake rotor 14, such as a drum brake, for the brake caliper shown in the drawings.

Further examples may include assemblies with just two brake modules, or three brake modules and a service brake, or two brake modules at either end of a service brake, or any other combination thereof.

Advantages, Features, Benefits

The different examples of the elliptically interfacing gear assisted braking system described herein provide several advantages over known solutions for frictional braking. For example, the illustrative examples of the braking system described herein allow a majority of rotational energy to be dissipated without generating thermal output. Additionally, and among other benefits, illustrative examples of the braking system described herein allow for a passive anti-skid functionality by automatic release of the torque load when loss of traction occurs. No known system or device can perform these functions, particularly in such a small volume. Thus, the illustrative examples described herein are particularly useful for aircraft and other vehicles requiring high performance braking systems that are also light and compact. However, not all examples described herein provide the same advantages or the same degree of advantage.

CONCLUSION

The disclosure set forth above may encompass multiple distinct devices with independent utility. Although examples of each of these devices has been disclosed, the specific examples thereof as disclosed and illustrated herein are not to be considered in a limiting sense, because numerous variations are possible. To the extent that section headings are used within this disclosure, such headings are for organizational purposes only, and do not constitute a characterization of any claim. The subject matter of the disclosure includes all novel and nonobvious combinations and subcombinations of the various elements, features, functions, and/or properties disclosed herein. The following claims particularly point out certain combinations and subcombinations regarded as novel and nonobvious. Devices embodied in other combinations and subcombinations of features, functions, elements, and/or properties may be claimed in applications claiming priority from this or a related application. Such claims, whether directed to a different device or to the same device, and whether broader, narrower, equal, or different in scope to the original claims, also are regarded as included within the subject matter of the present disclosure.

We claim:

1. A brake module comprising:
   a brake for selectively controlling a braking action;
   an annular brake rotor that mates with the brake, the annular brake rotor including a gear face with a reaction gear;
   an input shaft with an input gear surrounding a shaft, with the shaft extending through the annular brake rotor so that the input gear opposes the reaction gear; and
   an annular wobble plate trapped between the annular brake rotor and the input shaft, with a first face having face teeth that partially mesh with the input gear, and with a second face having wobble teeth that partially mesh with the reaction gear;
   wherein rotation of the input shaft causes the annular brake rotor and wobble plate to rotate; and
   wherein a braking action by the brake slows the annular brake rotor relative to the input shaft, thereby inducing a nutation of the annular wobble plate relative to the annular brake rotor and the input shaft to dissipate rotational energy.

2. The brake module of claim 1, further comprising a spline and a mating spline on opposing ends of the input shaft;
wherein the input shaft is shaped to mate with a second input shaft to interconnect multiple brake modules as an assembly.

3. The brake module of claim 1, wherein:
at least one of the wobble teeth on the annular wobble plate has a cross-sectional shape at least partially defined by a compound involute of a circle and an ellipse; and
the reaction gear is defined by a plurality of reaction teeth, and at least one of the plurality of reaction teeth has a cross-sectional shape at least partially defined by a compound involute of a circle and an ellipse.

4. The brake module of claim 1, wherein the face teeth on the annular wobble plate, opposite from the wobble teeth, define an annular wobble surface that is frustoconical.

5. The brake module of claim 4, wherein the annular wobble surface is configured such that a center of mass of the annular wobble plate is a vertex of the annular wobble surface.

6. The brake module of claim 1, further comprising:
a first annular bearing mounted on the input shaft;
a second annular bearing mounted on the input shaft;
a first annular housing mounted on the first annular bearing, and shaped to conform to a first corresponding portion of the annular brake rotor; and
a second annular housing mounted on the second annular bearing, and shaped to conform to a second corresponding portion of the annular brake rotor;
wherein the annular wobble plate is enclosed in an annular cavity defined between an assembly of the input shaft, the first annular bearing, the first annular housing, the annular brake rotor, the second annular housing, and the second annular bearing.

7. The brake module of claim 1, further comprising:
a first annular housing mounted on the input shaft;
a second annular housing mounted on the input shaft;
a first annular bearing mounted on the first annular housing; and
a second annular bearing mounted on the second annular housing;
wherein:
the annular brake rotor is mounted on both the first annular bearing and the second annular bearing; and
the annular wobble plate is enclosed in an annular cavity defined between an assembly of the input shaft, the first annular housing, the first annular bearing, the annular brake rotor, the second annular bearing, and the second annular housing.

8. The brake module of claim 1, further comprising:
a first annular bearing mounted on the input shaft;
a second annular bearing mounted on the input shaft;
a first annular housing mounted on the first annular bearing;
a third annular bearing mounted on the first annular housing;
a second annular housing mounted on the second annular bearing; and
a fourth annular bearing mounted on the second annular housing;
wherein:
the annular brake rotor is mounted on both the third annular bearing and the fourth annular bearing; and
the annular wobble plate is enclosed in an annular cavity defined between an assembly of the input shaft, the first annular bearing, the first annular housing, the third annular bearing, the annular brake rotor, the fourth annular bearing, the second annular housing, and the second annular bearing.

9. The brake module of claim 1, further comprising:
a first annular housing mounted on the input shaft, defining a first plane; and
a second annular housing mounted on the input shaft, defining a second plane;
wherein:
the annular brake rotor and the annular wobble plate are located between the first plane and the second plane;
the first annular housing includes at least one socket;
the second annular housing includes at least one locking lug, corresponding in shape and location to the at least one socket; and
the at least one socket and the at least one locking lug face in opposite directions.

10. A vehicle comprising the brake module of claim 1, and further comprising:
a wheel attached to the input shaft and rotatable about a rotation axis; and
an airframe attached to the wheel and the brake.

11. The vehicle of claim 10, further comprising:
a spline and a mating spline on opposing ends of the input shaft, with the spline mated with the wheel;
a second input shaft with a second spline mated with the mating spline so that the second input shaft is operatively fixed to the wheel concentric with the rotation axis, and with a second input gear concentric with the rotation axis;
a second brake rotor rotatably mounted on the second input shaft so that the second brake rotor is coaxial about the rotation axis;
a second brake fixed to the airframe and mated with the second brake rotor to selectively brake rotation of the second brake rotor relative to the wheel;
a second reaction gear attached to the second brake rotor, concentric with the rotation axis; and
a second wobble plate trapped between the second input gear and the second reaction gear, and including second face teeth that partially mesh with the second input gear, and including opposing second wobble teeth that partially mesh with the second reaction gear;
wherein the second wobble plate is axially restrained relative to the rotation axis so that the second wobble plate nutates at a non-zero angle relative to the rotation axis when the second brake rotor is braked relative to the wheel.

12. The vehicle of claim 10, further comprising:
a spline and a mating spline on opposing ends of the input shaft, with the spline mated with the wheel;
a service shaft with a second spline mated with the mating spline so that the service shaft is operatively fixed to the wheel concentric with the rotation axis, and with a service rotor fixed to the service shaft concentric with the rotation axis; and
a service brake fixed to the vehicle and mated with the service rotor to selectively stop rotation of the service rotor and thereby stop rotation of the wheel.

13. A brake module comprising:
an input shaft with an input gear surrounding a shaft, the shaft including a spline that mates with a corresponding rotating object;
an annular brake rotor rotatably mounted on the shaft, the annular brake rotor including a reaction gear that faces toward the input gear;

an annular wobble plate mounted on the shaft and trapped between the input gear and the reaction gear, with a first face having face teeth that partially mesh with the input gear, and with a second face having wobble teeth that partially mesh with the reaction gear; and a brake fixed to an external structure and mated with the annular brake rotor for selectively braking the annular brake rotor;

wherein rotation of the input shaft causes the annular wobble plate to rotate; and wherein a braking action by the brake slows the annular brake rotor relative to the input shaft, thereby inducing a nutation of the annular wobble plate relative to the annular brake rotor and the input shaft to dissipate rotational energy.

14. The brake module of claim 13, further comprising a mating spline on the input shaft opposite from the spline;

wherein the input shaft is shaped to mate with a second input shaft to interconnect multiple brake modules as an assembly.

15. The brake module of claim 13, further comprising:

a first annular bearing mounted on the input shaft;

a second annular bearing mounted on the input shaft;

a first annular housing mounted on the first annular bearing, and shaped to conform to a first corresponding portion of the annular brake rotor; and a second annular housing mounted on the second annular bearing, and shaped to conform to a second corresponding portion of the annular brake rotor;

wherein the annular wobble plate is enclosed in an annular cavity defined between an assembly of the input shaft, the first annular bearing, the first annular housing, the annular brake rotor, the second annular housing, and the second annular bearing.

16. The brake module of claim 13, further comprising:

a first annular housing mounted on the input shaft;

a second annular housing mounted on the input shaft;

a first annular bearing mounted on the first annular housing; and a second annular bearing mounted on the second annular housing;

wherein:

the annular brake rotor is mounted on both the first annular bearing and the second annular bearing; and the annular wobble plate is enclosed in an annular cavity defined between an assembly of the input shaft, the first annular housing, the first annular bearing, the annular brake rotor, the second annular bearing, and the second annular housing.

17. A method of decelerating a rotating object, comprising the following steps:

providing an input gear;

providing a brake rotor with a reaction gear;

providing a wobble plate with face teeth shaped to partially mesh with the input gear, and with opposing wobble teeth shaped to partially mesh with the reaction gear;

fixing the input gear to the rotating object so that the input gear is centered around a rotation axis of the rotating object;

suspending the wobble plate at a non-zero angle relative to the rotation axis, with at least one of the face teeth meshing with the input gear;

suspending the brake rotor concentric with the rotation axis, and with at least one of the wobble teeth meshing with the reaction gear; and braking the brake rotor to cause the wobble plate to nutate about the rotation axis.

18. The method of claim 17, further comprising the following steps:

providing an input shaft as an integral part of the input gear;

providing an annular housing shaped to mount on the input shaft and at least partially enclose the wobble plate;

rotatably supporting the annular housing on the input shaft; and rotatably supporting the brake rotor on the annular housing.

19. The method of claim 18, further comprising the following steps:

providing a second input shaft that mates with the input shaft, the second input shaft including a second input gear;

providing a second brake rotor with a second reaction gear;

providing a second wobble plate with second face teeth that partially mesh with the second input gear, and with opposing second wobble teeth that partially mesh with the second reaction gear;

mating the second input shaft to the input shaft;

suspending the second wobble plate at a non-zero angle relative to the rotation axis, with at least one of the second face teeth meshing with the second input gear, and with at least one of the second wobble teeth meshing with the second reaction gear; and braking the second brake rotor to cause the second wobble plate to nutate about the rotation axis.

20. The method of claim 19, further comprising the following steps:

providing a service rotor that mates with the input shaft; and braking the service rotor to selectively stop rotation of the service rotor and thereby stop rotation of the rotating object.

* * * * *